(12) United States Patent
Mimura et al.

(10) Patent No.: US 8,486,519 B2
(45) Date of Patent: *Jul. 16, 2013

(54) WHITE FILM FOR SURFACE LIGHT SOURCE REFLECTING MEMBERS

(75) Inventors: Takashi Mimura, Otsu (JP); Yoshio Tanaka, Echi-gun (JP); Hisashi Oowatari, Anpachi-gun (JP)

(73) Assignee: Toray Industries, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/523,976

(22) Filed: Sep. 20, 2006

(65) Prior Publication Data

US 2007/0014982 A1 Jan. 18, 2007

Related U.S. Application Data

(63) Continuation of application No. 10/070,697, filed as application No. PCT/JP01/05981 on Jul. 10, 2001, now Pat. No. 7,285,327.

(30) Foreign Application Priority Data

Jul. 12, 2000 (JP) .................................. 2000-210759

(51) Int. Cl.
*B32B 3/26* (2006.01)
*B32B 5/22* (2006.01)
*B32B 27/00* (2006.01)
*B32B 27/06* (2006.01)

(52) U.S. Cl.
USPC .................. 428/304.4; 428/317.9; 428/319.7; 428/480

(58) Field of Classification Search
USPC ................... 428/304.4, 317.9, 319.7, 480
See application file for complete search history.

(56) References Cited

U.S. PATENT DOCUMENTS

| | | | |
|---|---|---|---|
| 4,404,301 A | 9/1983 | Kubota et al. | |
| 5,672,409 A | 9/1997 | Miyakawa et al. | |
| 5,710,856 A | 1/1998 | Ishii et al. | |
| 6,015,874 A * | 1/2000 | Hiratani | 528/391 |
| 6,703,139 B1 | 3/2004 | Ogawa et al. | |
| 2004/0228146 A1* | 11/2004 | Koyama et al. | 362/561 |

FOREIGN PATENT DOCUMENTS

| | | |
|---|---|---|
| EP | 0 496 323 B1 | 5/1997 |
| JP | 63-62104 A | 3/1988 |
| JP | 2-202504 A | 8/1990 |
| JP | 6-322153 A | 11/1994 |
| JP | 7-118433 A | 5/1995 |
| JP | 10130568 A * | 5/1998 |
| WO | WO 00/02964 A1 | 1/2000 |

OTHER PUBLICATIONS

Abstract of JP 10130568.*
Translation of JP 10130568.*

* cited by examiner

*Primary Examiner* — Victor Chang
(74) *Attorney, Agent, or Firm* — DLA Piper LLP (US)

(57) ABSTRACT

A white film for a reflecting structure for surface light sources, which contains voids inside it and has a light stabilizer-containing coating film formed on at least one surface of it, is aged little with time and its brightness lowers little even when used for a long time. The white film ensures good image quality of display screens for a long time, and it is favorable to reflecting sheets and reflectors in edge light-type and direct back light-type surface light sources for liquid crystal display screens.

2 Claims, 1 Drawing Sheet

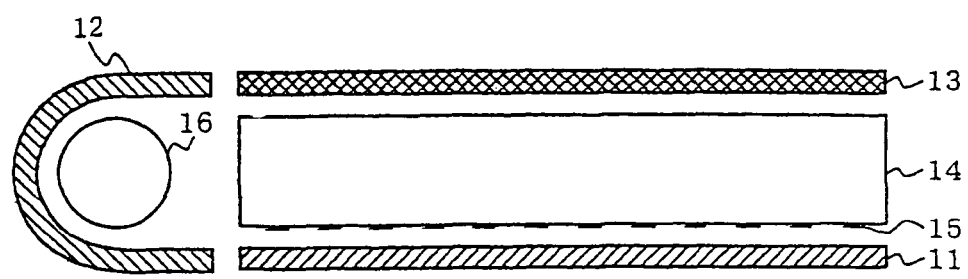

WHITE FILM FOR SURFACE LIGHT SOURCE REFLECTING MEMBERS

RELATED APPLICATION

This is a continuation of U.S. Ser. No. 10/070,697, filed Apr. 4, 2002, which is a §371 of International Application No. PCT/JP01/05981, with an international filing date of Jul. 10, 2001 (WO 02/04996 A1, published Jan. 17, 2002), which is based on Japanese Patent Application No. 2000-210759, filed Jul. 12, 2000.

TECHNICAL FIELD

The present invention relates to improvements on white film for a reflecting structure for surface light source. More precisely, the invention relates to a structure of white film which is used in reflecting sheets and reflectors for edge light-type and direct back light-type, surface light sources for liquid crystal display screens, and of which the brightness lowers little when used for a long time.

BACKGROUND ART

For lighting units for liquid crystal display screens, widely used is a edge light system in which a cold cathode-ray tube serving as the source of light is disposed at the edge of a light guide plate (JP-A 62104/1988). In the lighting system of the type, a reflector is disposed around the cold cathode-ray tube for increasing the lighting efficiency therein, and a reflecting sheet is disposed below the light guide plate for efficiently reflecting the light having been diffused through the light guide plate toward a liquid crystal display screen. In the system, these have the function of reducing the loss of light from the cold cathode-ray tube and increasing the brightness of the liquid crystal display screen. However, the edge light system could not increase the brightness of recent wide screens of liquid crystal TVs, for which, therefore, a direct back light system is being employed. In the direct back light system, cold cathode-ray tubes are aligned in parallel below a liquid crystal display screen, and they are above a reflecting sheet in parallel with each other. The reflecting sheet may be flat or may be semi-circularly shaped to partly cover each cold cathode-ray tube.

For use in the surface light source for such liquid crystal display screens, the reflector and the reflecting sheet (these are generically referred to as a reflecting structure for surface light source) are required to have high reflectivity, for which generally used are films with white dye or pigment added thereto or films with fine voids therein either alone or as laminated with any of metal or plastic plates. The films with fine voids therein are widely used as their ability to improve screen brightness and uniformity is good. They are disclosed in, for example, JP-A 322153/1994 and 118433/1995.

The recent expansion of the use of liquid crystal display screens is remarkable. For example, they are being widely used not only in conventional notebook-size personal computers but also in desk-top personal computers, liquid-crystal TVs, mobile telephone displays, various game computers, etc. With the expansion of their use, the screens are desired to have increased brightness and increased fineness, for which the power of the lighting source is increased and the number of the light source lamps is increased. In addition, for satisfying the requirement of long-term lighting of wide screens of liquid crystal TVs, they are required to have more increased brightness and durability. In particular, when the screens are lighted by a direct back light system, they shall directly receive the light from the light source. For these, the durability of the reflecting sheet is required to be higher. However, reflectors and reflecting sheets of conventional film are problematic in that the film is aged and yellowed when used for a long time and therefore its reflectivity is lowered with time and the screen brightness is after all lowered.

The present invention is to solve the problems noted above, and its object is to provide a reflecting structure for surface light source of which the brightness lowers little with time even when used for a long time and which ensures high-quality images for a long time.

DISCLOSURE OF THE INVENTION

To solve the problems as above, the subject matter of the invention resides in a white film for surface light source reflecting structures, which contains voids inside it and has a light stabilizer-containing coating film formed on at least one surface of it.

BRIEF DESCRIPTION OF THE DRAWING

FIG. 1 is a vertical cross-sectional view showing the outline structure of a device for measuring the brightness of the surface light source in the invention.

BEST MODES OF CARRYING OUT THE INVENTION

The white film of the invention is not specifically defined so far as it is apparently white, including, for example, thermoplastic films with any of organic or inorganic dye or fine particles added thereto; films formed by mixing a film-forming resin component and a resin not miscible with it, and/or organic or inorganic particles, melt-kneading the resulting mixture, and stretching it at least in one direction to thereby make the film have fine voids therein; foam films formed through melt extrusion with foaming particles added thereto; and foam films formed through foaming extrusion with a vapor such as carbon dioxide introduced thereinto. Especially for the use of the invention, preferred are films formed by mixing a film-forming resin component and a resin not miscible with it, and/or organic or inorganic particles, melt-kneading the resulting mixture, and stretching it at least in one direction to thereby make the film have fine voids therein, as their reflectivity is higher and their brightness is higher. More preferred are composite films formed through coextrusion of laminating an organic or inorganic fine particles-containing thermoplastic resin film on at least one surface of a film that contains fine voids therein, followed by stretching the laminate film to thereby make it have finer voids in the surface layer than in the inside thereof.

The thermoplastic resin to form the film is not specifically defined so far as it forms films through melt extrusion. Its preferred examples are polyesters, polyolefins, polyamides, polyurethanes, and polyphenylene sulfides. In the invention, especially preferred are polyesters as they have good dimensional stability and good mechanical properties and they do not almost absorb visible light.

Examples of the polyesters are polyethylene terephthalate (hereinafter referred to as PET), polyethylene 2,6-naphthalenedicarboxylate (hereinafter referred to as PEN), polypropylene terephthalate, polybutylene terephthalate, and poly-1, 4-cyclohexylenedimethylene terephthalate. Needless-to-say, these polyesters may be homopolymers or copolymers, but are preferably homopolymers. For the copolymers, the comonomer includes, for example, aromatic dicarboxylic acids, aliphatic dicarboxylic acids, alicyclic dicarboxylic acids, and diols having from 2 to 15 carbon atoms. Their examples are isophthalic acid, adipic acid, sebacic acid, phthalic acid, sulfonate base-containing isophthalic acid, and their ester-forming compounds, diethylene glycol, triethylene glycol, neopentyl glycol, and polyalkylene glycols having a molecular weight of from 400 to 20,000.

These polyesters may contain various additives such as heat-resistant stabilizer, antioxidant stabilizer, organic lubricant, organic and inorganic fine particles, light-proofing agent, antistatic agent, nucleating agent and coupling agent, not interfering with the effect of the invention.

One preferred embodiment of the invention is described below, in which polyester is used as the white film base material. To whiten the polyester film, for example, employable are a method of adding thereto various types of white dye or pigment; and a method of forming fine voids inside it as in the above. For attaining better results in the invention, preferred is the method of forming fine voids inside the film. For forming such fine voids inside it, for example, employable are (1) a method of adding a foaming agent to the resin to thereby make the resin film foamed by heat in the step of extrusion or film processing or foamed through chemical decomposition; (2) a method of adding a vapor such as carbon dioxide or a vaporizable substance to the resin during or after its extrusion to thereby make the resin film foamed; (3) a method of adding a thermoplastic resin not miscible with polyester to the resin, melt-extruding the resin mixture, and monoaxially or biaxially stretching the resin film; and (4) a method of adding organic or inorganic fine particles to the resin, melt-extruding the mixture, and monoaxially or biaxially stretching the resin film. In the invention, the fine voids formed in the film are to increase the reflective interface therein, for which, therefore, preferred is the method (3) or (4).

The size of the voids formed in the methods as above (this is the size of the cross section of the voids cut in the direction of the thickness of the film) preferably falls between 0.5 $\mu m^2$ and 50 $\mu m^2$, more preferably between 1 $\mu m^2$ and 30 $\mu m^2$, in view of the increased brightness of the film. The cross-sectional profile of the voids may be circular or oval. Preferably, the film is so constituted that at least one void exists everywhere in its vertical direction running from the top face to the back face thereof. When the film is formed into a reflecting sheet, the light from a light source enters it through the film surface, and it is the best that all the incident light having reached the reflecting sheet is entirely reflected by the voids inside the film. In fact, some light will pass through the film, and it shall be a light loss. To compensate it, the surface of the film opposite to the surface thereof that receives light (facing the light source) is preferably coated with metal such as aluminium or silver through vapor deposition. In addition, for reducing the light loss through the fine voids-containing polyester film, it is also desirable that the surface of the film is coated with a layer that contains fine voids formed by organic or inorganic fine particles. The surface layer may be formed by co-extruding a polyester resin that contains organic or inorganic fine particles, along with the resin for the fine voids-containing film, followed by stretching the resulting composite film at least in one direction. Preferably, the voids in the surface layer are smaller than those in the inner layer of the composite film for increasing the brightness of the film. The ratio (void size in surface layer/void size in inner layer) is not specifically defined, but preferably falls between 0.05 and 0.8, more preferably between 0.07 and 0.7, most preferably between 0.1 and 0.6. The void size can be controlled by controlling the size of the particles to be added to film-forming resins.

Now described hereinunder are the resin not miscible with polyester resin, and the organic or inorganic particles to be added to the surface layer and the inner layer, which are to form voids in polyester films. The resin not miscible with polyester film (hereinafter referred to as immiscible resin) is a thermoplastic resin except polyester, and this can disperse in polyester, forming particles therein. Preferred examples of the resin of the type are polyolefin resins such as polyethylene, polypropylene, polybutene, polymethylpentene; as well as polystyrene resins, polyacrylate resins, polycarbonate resins, polyacrylonitrile resins, polyphenylene sulfide resins, and fluororesins. These may be homopolymers or copolymers, and two or more different types of these may be combined for use herein. Especially preferred are resins that yield a great critical surface tension difference from polyester and hardly deform in heat treatment after stretching. For these, preferred are polyolefin resins, and more preferred is polymethylpentene. The content of the immiscible resin to be in the white film is not specifically defined, and may be suitably determined so that the film is not broken while formed and the brightness of the film can be increased by the voids formed from the nuclei of the immiscible resin in the film. In general, it falls preferably between 3 and 35% by weight, more preferably between 4 and 30% by weight, most preferably between 5 and 25% by weight. If the content is smaller than 3% by weight, the brightness of the film could not increase so much; but if larger than 35% by weight, the film may be broken while formed.

The inorganic fine particles to be added to the inner layer and/or the surface layer are preferably those that may be nuclei by themselves to form voids in the layers. For these, for example, usable are calcium carbonate, magnesium carbonate, zinc carbonate, titanium oxide (anatase type, rutile type), zinc oxide, barium sulfate, zinc sulfide, basic zinc carbonate, titanium mica, antimony oxide, magnesium oxide, calcium phosphate, silica, alumina, mica, talc, kaolin. Of those, especially preferred are calcium carbonate and barium carbonate that absorb little visible light falling within a range of from 400 to 700 nm. Particles that absorb visible light are problematic as the brightness of the film containing them is lowered. The organic fine particles are preferably those not fusing in melt extrusion. For these, especially preferred are crosslinked particles of crosslinked styrene or crosslinked acryl. The organic fine particles may be hollow. One or more different types of these fine particles may be used herein either singly or as combined. The particle size is not specifically defined, generally falling between 0.05 and 15 $\mu m$, preferably between 0.1 and 10 $\mu m$, more preferably between 0.3 and 5 $\mu m$. If their size is smaller than 0.05 $\mu m$, the particles could not yield good voids in films; but, on the contrary, if larger than 15 $\mu m$, it is unfavorable since the film surface may be too much roughened. In case where fine particles are in the surface layer and immiscible resin is in the inner layer, it is desirable that the size of the voids formed from the nuclei of the fine particles in the surface layer is smaller than that of the size of the voids formed in the inner layer in order that the brightness of the film is higher. Also preferably, the content of the fine particles in the white film falls between 1 and 30% by weight, more preferably between 2 and 25% by weight, most preferably between 3 and 20% by weight. If the content is smaller than 1% by weight, the brightness of the film could not be increased to a desired degree; but, on the contrary, if larger than 30% by weight, the film may be broken while formed.

The specific gravity of the voids-containing white film, which is a criterion of the void content of the film, is preferably not smaller than 0.1 but smaller than 1.3. If the specific gravity of the film is smaller than 0.1, it is problematic in that the mechanical strength of the film is low and the film is readily folded and is difficult to handle. On the other hand, if the specific gravity of the film is larger than 1.3, the void content thereof is too low, and therefore the reflectivity of the film is low and the brightness thereof may be insufficient. In case where the film-forming thermoplastic resin is polyester, the lowermost limit of the specific gravity of the film is preferably 0.4. If its specific gravity is smaller than 0.4, the void content of the film is too high, and it is problematic in that the film is frequently broken while formed.

The reflecting structure for surface light source is a tabular structure that is combined with a surface light source for light reflection thereon, as so mentioned hereinabove. Concretely, it includes reflecting sheets for edge lights-type surface light sources for liquid crystal display screens, reflecting sheets for direct back light-type surface light sources, and reflectors around cold cathode-ray tubes. For the reflecting structure for surface light source of the type, the degree of whiteness of the reflecting sheet is preferably higher for bettering the color tone of screens, and bluish reflecting sheets are preferred to yellowing ones. Taking this into consideration, it is desirable to add a fluorescent brightener to the white film. The fluorescent brightener may be any commercially-available one, including, for example, Uvitex (by Ciba-Geigy), OB-1 (by Eastman), TBO (by Sumitomo Seika), Keikol (by Nippon Soda), Kayalite (by Nippon Kayaku), and Leucopoor EGM (by Clariant Japan). Preferably, the content of the fluorescent brightener in the white film falls between 0.005 and 1% by weight, more preferably between 0.007 and 0.7% by weight, most preferably between 0.01 and 0.5% by weight. If its content is smaller than 0.005% by weight, the fluorescent brightener may be ineffective; but if larger than 1% by weight, it is unfavorable since too much fluorescent brightener rather yellows the white film. In case where the white film is a composite film, the fluorescent brightener is more preferably added to the surface layer of the film.

In the invention, at least one surface of the white film must be coated with a light stabilizer-containing coating layer. The light stabilizer may be any of organic light stabilizers of, for example, hindered amines, salicylates, benzophenones, benzotriazoles, cyanoacrylates, triazines, benzoates, oxalic anilides; and inorganic light stabilizers of, for example, sol-gel compounds. Preferred examples of the light stabilizer for use in the invention are mentioned below. Needless-to-say, these are not limitative.

Hindered amines: bis(2,2,6,6-tetramethyl-4-piperidyl)sebacate, polycondensate of dimethyl succinate/1-(2-hydroxyethyl)-4-hydroxy-2,2,6,6-tetramethylpiperidine;

Salicylates: p-t-butylphenyl salicylate, p-octylphenyl salicylate;

Benzophenones: 2,4-dihydroxybenzophenone, 2-hydroxy-4-methoxybenzophenone, 2-hydroxy-4-methoxy-5-sulfobenzophenone, 2 2',4,4'-tetrahydroxybenzophenone, 2,2'-dihydroxy-4-methoxybenzophenone, 2,2'-dihydroxy-4,4'-dimethoxybenzophenone, bis(2-methoxy-4-hydroxy-5-benzoylphenyl)methane;

Benzotriazoles: 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, 2-(2'-hydroxy-3',5'-di-t-amylphenyl)benzotriazole, 2,2'-methylenebis[4-(1,1,3,3-tetramethylbutyl)-6-(2H-benzotriazol-2-yl)phenol], 2-(2'-hydroxy-5'-methacryloxyphenyl)-2H-benzotriazole, 2-[2'-hydroxy-3'-(3",4",5",6"-tetrahydrophthalimidomethyl)-5'-methylphenyl]benzotriazole, 2-(2'-hydroxy-5-acryloyloxyethylphenyl)-2H-benzotriazole, 2-(2'-hydroxy-5'-methacryloxyethylphenyl)-2H-benzotriazole, 2-(2'-hydroxy-3'-t-butyl-5'-acryloylethylphenyl)-5-chloro-2H-benzotriazole;

Cyanoacrylates: ethyl-2-cyano-3,3'-diphenylacrylate;

Others than the above: nickelbis(octylphenyl)sulfide, [2,2'-thiobis(4-t-octylphenolato)]-n-butylaminenickel, nickel complex-3,5-di-t-butyl-4-hydroxybenzyl phosphate monoethylate, nickel dibutyldithiocarbamate, 2,4-di-t-butylphenyl 3',5'-di-t-butyl-4'-hydroxybenzoate, 2,4-di-t-butylphenyl 3',5'-di-t-butyl-4'-hydroxybenzoate, 2-ethoxy-2'-ethyloxalic acid bisanilide, 2-(4,6-diphenyl-1,3,5-triazin-2-yl)-5-[(hexyl)oxy]-phenol.

Of the examples mentioned above, at least any of hindered amines, benzophenones and benzotriazoles are preferred for use in the invention, more preferably, these are combined for use herein.

In the invention, the light stabilizer to be in the coating layer is preferably mixed with any other resin component for facilitating the formation of the coating layer. Specifically, one preferred embodiment for it comprises dissolving or dispersing the resin component and the light stabilizer in an organic solvent capable of dissolving the resin component and the light stabilizer, or in water, a mixture of two or more different types of organic solvents, or a mixture of organic solvent/water to prepare a solution or dispersion that serves as the coating liquid for the layer. Needless-to-say, the resin component and the light stabilizer may be separately dissolved or dispersed in such an organic solvent, water, an organic solvent mixture or a mixture of organic solvent/water, and the resulting solutions or dispersions may be mixed in any desired ratio to be the coating liquid. Also preferred is preparing a copolymer of the light stabilizer component and the resin component followed by directly using the copolymer for the coating material. Needless-to-say, the copolymer may be dissolved in an organic solvent, water, a mixture of two or more different types of organic solvent, or a mixture of organic solvent/water to prepare a solution for the coating liquid. The resin component to be mixed or copolymerized with the light stabilizer is not specifically defined. Its examples are polyester resins, polyurethane resins, acrylic resins, methacrylic resins, polyamide resins, polyethylene resins, polypropylene resins, polyvinyl chloride resins, polyvinylidene chloride resins, polystyrene resins, polyvinyl acetate resins, and fluororesins. These resins may be used either singly or as combined to be a copolymer or mixture of two or more of them.

Of the resin components mentioned above, preferred for the coating layer are acrylic resins or methacrylic resins, and more preferred are acrylic resins or methacrylic resins copolymerized with the light stabilizer component. For copolymerizing these, it is desirable that the acrylic or methacrylic monomer component is copolymerized with the light stabilizer monomer component.

For the light stabilizer monomer component, for example, preferred are reactive benzotriazole monomers, reactive hindered amine monomers, and reactive benzophenone monomers. Not specifically defined, the benzotriazole monomers may be any ones having a benzotriazole skeleton and having an unsaturated bond. Their examples are 2-(2'-hydroxy-5-acryloyloxyethylphenyl)-2H-benzotriazole, 2-(2'-hydroxy-5'-methacryloxyethylphenyl)-2H-benzotriazole, and 2-(2'-hydroxy-3'-t-butyl-5'-acryloylethylphenyl)-5-chloro-2H-benzotriazole. Similarly, the reactive hindered amine monomers and the reactive benzophenone monomers may be any ones having a hindered amine or benzophenone skeleton and having an unsaturated bond. Examples of the reactive hindered amine monomers are bis(2,2,6,6-tetramethyl-4-piperidyl-5-acryloyloxyethylphenyl)sebacate, polycondensate of dimethyl succinate/1-(2-hydroxyethyl)-4-hydroxy-2,2,6,6-tetramethyl-5-acryloyloxyethylphenylpiperidine, bis(2,2,6,6-tetramethyl-4-piperidyl-5-methacryloxyethylphenyl)sebacate, polycondensate of dimethyl succinate/1-(2-hydroxyethyl)-4-hydroxy-2,2,6,6-tetramethyl-5-methacryloxyethylphenylpiperidine, bis(2,2,6,6-tetramethyl-4-piperidyl-5-acryloylethylphenyl) sebacate, and polycondensate of dimethyl succinate/1-(2-hydroxyethyl)-4-hydroxy-2,2,6,6-tetramethyl-5-acryloylethylphenylpiperidine. Examples of the reactive benzophenone monomers are 2-hydroxy-4-methoxy-5-acryloyloxyethylphenylbenzophenone, 2,2',4,4'-tetrahydroxy-5-acryloyloxyethylphenylbenzophenone, 2,2'-dihydroxy-4-methoxy-5-acryloyloxyethylphenylbenzophenone, 2,2'-dihydroxy-4,4'-dimethoxy-5-acryloyloxyethylphenylbenzophenone, 2-hydroxy-4-methoxy-5-methacryloxyethylphenylbenzophenone, 2,2',4,4'-tetrahydroxy-5-methacryloxyethylphenylbenzophenone, 2,2'-dihydroxy-4-methoxy-5-acryloylethylphenylbenzophenone, and 2,2'-dihydroxy-4,4'-dimethoxy-5-acryloylethylphenylbenzophenone.

Examples of the acrylic or methacrylic monomer component or its oligomer component to be copolymerized with the light stabilizer monomer component are alkyl acrylates, alkyl methacrylates (the alkyl group includes, for example, methyl, ethyl, n-propyl, isopropyl, n-butyl, isobutyl, t-butyl, 2-ethylhexyl, lauryl, stearyl and cyclohexyl groups), and crosslinking functional group-having monomers such as those having any of a carboxyl group, a methylol group, an acid-anhydride group, a sulfonic acid group, an amido group, a methylolated amido group, an amino group, an alkylolated amino group, a hydroxyl group, and an epoxy group. Apart from these, the light stabilizer monomer component may be copolymerized into copolymers with any of acrylonitrile, methacrylonitrile, styrene, butyl vinyl ether, maleic acid, itaconic acid and dialkyl esters thereof, methyl vinyl ketone, vinyl chloride, vinylidene chloride, vinyl acetate, vinylpyridine, vinylpyrrolidone, vinyl group-having alkoxysilanes, and unsaturated polyesters.

The copolymerization ratio of the light stabilizer monomer component to the comonomer is not specifically defined, and the light stabilizer monomer component may be copolymerized with one or more such comonomers in any desired ratio. Preferably, however, the ratio of the light stabilizer monomer component to the comonomer is at least 10% by weight, more preferably at least 20% by weight, most preferably at least 35% by weight. Needless-to-say, the light stabilizer monomer component may form a homopolymer. The molecular weight of the polymer is not specifically defined, but is generally at least 5,000, preferably at least 10,000, most preferably at least 20,000 in order that the coating layer formed of the polymer could be tough. The polymer is formed into the coating layer, after dissolved or dispersed in an organic solvent, water or a mixture of organic solvent/water. Apart from these, other commercially-available hybrid-type light stabilizer polymers, for example, U-Double (by Nippon Shokubai) may also be used herein.

The thickness of the light stabilizer-containing coating layer is not specifically defined, preferably falling between 0.5 and 15 µm, more preferably between 1 and 10 µm, most preferably between 2 and 7 µm. If the thickness is smaller than 0.5 µm, the durability of the coating layer may be low; but, on the contrary, if larger than 15 µm, the brightness of the layer-coated white film may lower.

The light stabilizer-containing coating layer may be directly formed on the white film. However, when the adhesiveness between the layer and the film is low, the film is preferably corona-discharged or undercoated. For undercoating it, employable is any of an in-line coating process in which the white film is undercoated in the line where it is formed, or an off-line coating process in which the substrate is, after separately prepared in a film-forming line, undercoated in a different coating line. The undercoating material is not specifically defined, and may be selected from any desired ones. Its preferred examples are copolyester resins, polyurethane resins, acrylic resins, methacrylic resins, and various coupling agents.

The light stabilizer-containing coating layer may be formed on the white film in any desired manner. For it, for example, employable is any method of gravure coating, roll coating, spin coating, reverse coating, bar coating, screen coating, blade coating, air knife coating or dipping. In case where the coating layer is cured, after formed, employable is any known curing method. For example, the coating layer may be cured through exposure to heat or to active rays such as UV rays, electron rays or radiations, or exposure to any of these combinations. In curing it, a curing agent such as a crosslinking agent is preferably used. For forming the coating layer, employable is any of an in-line coating process in which the white film is coated with the coating layer in the line where it is formed, or an off-line coating process in which the substrate is, after separately prepared and processed for crystal orientation therein in a film-forming line, coated with the coating layer in a different coating line.

Preferably, the white film of the invention has a mean reflectance of at least 85%, more preferably at least 87%, even more preferably at least 90%, when measured on the light stabilizer-containing coating layer thereof exposed to light having a wavelength of from 400 to 700 nm. If the mean reflectance of the white film is smaller than 85%, the screen brightness of some liquid crystal displays comprising the white film may be low, depending on the type of the displays.

Also preferably, the white film of the invention has a degree of glossiness of at most 60%, more preferably at most 50%, most preferably at most 40%, when measured on the light stabilizer-containing coating layer thereof. If the glossiness of the white film is larger than 60%, the screen brightness of some liquid crystal displays comprising the white film may be low, depending on the viewing angle to the screen.

In the invention, the light stabilizer-containing coating layer may contain various additives not interfering with the effect of the invention. The additives are, for example, organic and/or inorganic fine particles, fluorescent brightener, crosslinking agent, heat-resistant stabilizer, antioxidant stabilizer, organic lubricant, antistatic agent, nucleating agent, and coupling agent.

Adding organic and/or inorganic fine particles to the coating layer is especially preferred, as making it easy to control the glossiness of the layer-coated surface of the white film within the defined range as above. For the inorganic fine particles, for example, usable are silica, alumina, titanium oxide (anatase type, rutile type), zinc oxide, barium sulfate, calcium carbonate, zeolite, kaolin, and talc. For the organic particles, for example, usable are crosslinked styrene and crosslinked acryl. Preferably, the particle size of the organic and/or inorganic fine particles falls between 0.05 and 15 µm, more preferably between 0.1 and 10 µm. If smaller than 0.05 µm, the effect of the particles to reduce the surface glossiness may be low; but, on the contrary, if larger than 15 µm, it is unfavorable since the surface of the white film may be too much roughened and the particles may readily drop off. The content of the particles in the coating layer preferably falls between 0.5 and 50% by weight, more preferably between 1 and 40% by weight, most preferably between 2 and 30% by weight. If the content is smaller than 0.5% by weight, the effect of the particles to reduce the surface glossiness may be low; but, on the contrary, if larger than 50% by weight, it is unfavorable since the coating layer is difficult to form and, in addition, the surface of the white film may be too much roughened and the particles may readily drop off.

Adding a fluorescent brightener to the coating layer is more preferred, as improving the whiteness and the appearance of the layer-coated white film. The fluorescent brightener may be the same as those mentioned hereinabove that can be added to the white film. The fluorescent brightener content of the coating layer preferably falls between 0.01 and 2% by weight, more preferably between 0.03 and 1.5% by weight, most preferably between 0.5 and 1% by weight. If its content is smaller than 0.01% by weight, the fluorescent brightener may be ineffective; but if larger than 2% by weight, it is unfavorable since the coating layer may be rather yellowed and the durability thereof may lower.

Preferably, the thickness of the white film in the invention falls between 10 and 500 µm, more preferably between 2.0 and 300 µm. If the thickness thereof is smaller than 10 µm, the reflectivity, the whiteness and the appearance of the white film may not reach the practical level, and the white film may be difficult to handle. On the other hand, if thicker than 500 µm, the white film may be too heavy and may be therefore unsuitable for a reflecting structure for surface light sources to be in liquid crystal displays, and, in addition, its cost may increase. In case where the white film is a composite film, the ratio of surface layer/inner layer thereof preferably falls between 1/30 and 1/3, more preferably between 1/20 and 1/4. In case where the composite film has a three-layered structure of surface layer/inner layer/surface layer, the ratio shall be represented by total of the two surface layers/inner layer.

One embodiment of producing the white film for a reflecting structure for surface light sources of the invention is described below, to which, however, the invention is not limited.

A composite film-forming device equipped with an extruder A and an extruder B is prepared. To the extruder A, fed is a mixture of 85 parts by weight of dry PET chips, 15 parts by weight of polymethylpentene, and 1 part by weight of polyethylene glycol having a molecular weight of about 4000. To the extruder B, fed is a mixture of 90 parts by weight of PET, 10 parts by weight of calcium carbonate particles having a mean particle size of about 1 µm, and 0.03 parts by weight of a fluorescent brightener. Needless-to-say, the raw material components to be fed into the extruders A and B may be previously mixed and pelletized. The extruders A and B are heated at 280 to 300° C., and the mixtures therein are melted and extruded out in such a manner that the inner layer of the melt from the extruder A is sandwiched between two surface layers of the melt from the extruder B to thereby constitute a composite laminate sheet. Then, the thus-extruded sheet is solidified on a chili drum having a surface temperature of from 10 to 60° C. In this step, preferably, the drum is electrostatically charged so that the sheet can be airtightly held thereon and can be therefore uniformly solidified thereon. Then, the thus-cooled and solidified sheet is led to rolls heated at 70 to 120° C., by which the sheet is stretched about 2 to 5 times in the machine direction, and thereafter it is cooled around rolls kept at 20 to 40° C. In the continuous line, the film is then led into a tenter while its edges are held by clips, in which it is preheated at 90 to 120° C. and stretched 3 to 6 times in the lateral direction. Still in the continuous line, the thus-stretched sheet is led into a zone heated at 180 to 230° C., in which it is thermoset for about 3 to 20 seconds and then cooled to 40° C. or lower. In that manner, the white film of the invention is fabricated. To one surface of the thus-fabricated white film, applied is a coating liquid prepared by mixing a UV-absorbing compound, a light stabilizer and a resin in a predetermined ratio, and the thus-coated film is then dried.

The white film for a reflecting structure for surface light sources of the invention, thus obtained in the manner as above, has good initial brightness and is aged little even in long-term use, and it is effective for keeping the brightness of liquid crystal display screens.

[Methods of Measuring and Evaluating Characteristics]

(1) Mean Void Diameter:

The cross section of the film is observed at 3,000 to 200,000 magnifications, using a transmission electronic microscope, HU-12 Model (by Hitachi). With the voids seen therein being marked, the TEM picture is analyzed by the use of a high-vision image analyzer, PIAS-IV (by PIAS). Concretely, 100 of the voids are converted into true circles, and they are averaged to obtain the mean void diameter of the voids.

(2) Specific Gravity:

The film is cut into pieces of 50 mm×60 mm each. Using a high-precision electronic gravimeter SD-120L (by Mirage Trade) the piece sample is measured according to the method A (underwater displacement) of JIS K-7112. In measuring it, the temperature is 23° C. and the humidity is 65% RH.

(3) Glossiness:

Using a digital varied-angle glossmeter, UGV-5B (by Suga Test Instruments), the film is measured according to JIS Z-8741, with its white polyester layer (A) being exposed to light. The incident angle is 60°, and the light intercepting angle is 60°.

(4) Mean Reflectance:

Using a spectrocolorimeter, SE-2000 Model (by Nippon DenshokuKogyo), the spectral reflectance of the film is measured at intervals of 10 nm within a range of from 400 to 700 nm, according to JIS Z-8722. The data are averaged, and it indicates the mean reflectance of the film.

(5) Brightness of Surface Light Source:

As in the device of FIG. 1, a dot pattern 15 is printed on a transparent acrylic light guide plate 14 of 2 mm thick. On the side of the dot pattern printed on the transparent acrylic light guide plate, set is a reflecting sheet 11 made of a film sample; and on the other side thereof, laminated is a diffuser 13 made of a semi-transparent sheet. A cold cathode-ray tube 16 of 6 W fluorescent lamp is fitted to one end of the transparent light guide plate 14, and it is covered with a reflector 12 as in FIG. 1. The fluorescent lamp is put on, and the brightness (cd/m$^2$) of this structure is measured on the side of the diffuser 13, using a digital photometer J16 and a brightness probe J6503 (by Tectronics). The light interceptor of the brightness probe fitted to the photometer is applied vertically to the diffuser 13. 9 points in 9 uniform sections of the diffuser surface are measured three times each, and the data are averaged.

(6) Mean Reflectance and Brightness after Durability Test:

Using a UV aging promotion tester, I-Super UV Tester SUV-W131 (by Iwasaki Electric); film samples are forcedly exposed to UV rays under the condition mentioned below.

Condition of UV Irradiation:

Illuminance, 100 mW/cm$^2$; temperature, 60° C.; humidity, 50% RH; time for irradiation, 8 hours.

After thus exposed to UV rays, the sample films are measured to determine the mean reflectance and the brightness thereof, according to the methods (4) and (5).

EXAMPLES

The invention is described with reference to the following Examples and Comparative Examples, to which, however, the invention is not limited.

Example 1

Raw material mixtures mentioned below were fed into a composite film-forming device equipped with an extruder A and an extruder B.

Extruder A:

90 parts by weight of PET chips dried in vacuum at 180° C. for 4 hours, 10 parts by weight of polymethylpentene, and 1 part by weight of polyethylene glycol having a molecular weight of 4000.

Extruder B:

100 parts by weight of PET chips containing 15% by weight of barium sulfate particles having a mean particle size of 1 μm, and dried in vacuum at 180° C. for 4 hours, and 3 parts by weight of PET master chips containing 1% by weight of a fluorescent brightener, OB-1 (by Eastman), and dried in vacuum at 180° C. for 4 hours.

In the extruders A and B, the mixtures were separately melted and extruded out of them at 290° C. in such a manner that the melt from the extruder A could be an inner layer sandwiched between two outer layers of the melt from the extruder B, and the resulting laminate melt was extruded out through a T-die into a sheet. The thickness ratio, B/A/B of the composite film was 5/90/5. This was cast onto a mirror-face chill drum having a surface temperature of 20° C. to be a non-stretched sheet. The sheet was pre-heated by rolls heated at 90° C., and then, at 95° C., it was stretched 3.5 times in the machine direction. One surface of the monoaxially-stretched sheet was corona-discharged in air, and then coated with a polyurethane emulsion, AP-40 (by Dai-Nippon Ink) to have thereon a coating layer having a dry thickness of 0.3 μm. Next, the sheet was led into a tenter heated at 105° C., with its edges being held by clips, in which water was removed from the coating layer. In the continuous line at 110° C., the sheet was then stretched 3.5 times in the lateral direction. Still in the continuous line, the sheet was thermoset at 215° C. for 8 seconds. The white film thus fabricated had an overall thickness of 188 μm.

The polyurethane-coated surface of the white film was coated with a coating liquid containing a light stabilizer, U-Double UV6010 (by Nippon Shokubai) to form thereon a coating, layer having a dry thickness of 5 μm. Thus coated, this was dried in hot air at 150° C. for 2 minutes. The thus-fabricated white film for a reflecting structure for surface light sources was yellowed little in the durability test, and its mean reflectance reduction and brightness reduction were small, as in Table 1.

Comparative Example 1

The white film prepared in Example 1 was directly tested for its applicability to the white film in the reflecting structure for surface light source illustrated. Its initial brightness was good, but its durability was extremely poor. Concretely, it was greatly yellowed in the durability test, and its mean reflectance reduction and brightness reduction were noticeable.

Examples 2 to 5

A white film was prepared in the same manner as in Example 1. The polyurethane-coated surface of the white film was coated with the same light stabilizer-containing coating liquid as in Example 1 to form thereon a coating layer having a dry thickness of 1 μm (Example 2), 3 μm (Example 3), 7 μm (Example 4), or 10 μm (Example 5). These samples were all superior to the sample of Comparative Example 1, though the durability of the samples of which the thickness of the coating layer was smaller than that of the sample of Example 1 (Examples 2 and 3) lowered in some degree and the initial brightness of the samples of which the thickness of the coating layer was larger than that of the sample of Example 1 (Examples 4 and 5) lowered in some degree.

Example 6

A white film was prepared in the same manner as in Example 1. The polyurethane-coated surface of the white film was coated with a coating liquid having the composition mentioned below to form thereon a light stabilizer-containing coating layer, in the same manner as in Example 1. The thus-fabricated white film for a reflecting structure for surface light sources was yellowed little in the durability test, and its mean reflectance reduction and brightness reduction were small, as in Table 1.

(Coating Liquid for Forming Coating Layer)

| | |
|---|---|
| U-Double UV714 (40% solution by Nippon Shokubai) | 10.0 g |
| Sumidule N3200 (curing agent, by Sumitomo-Bayer Urethane) | 0.5 g |
| Ethyl acetate/toluene (1/1 by weight) | 12.0 g |

[Examples 7, 8, 9]

A white film was prepared in the same manner as in Example 6. The polyurethane-coated surface of the white film was coated with a coating liquid that had been prepared by mixing 20.0 g of the coating liquid in Example 1 with 0.13 g (solid content, 3% by weight), 0.21 g (solid content, 5% by weight) or 0.3 g (solid content, 7% by weight) of inorganic fine particles of silica powder (Fuji Silicia's SYLOPHOBIC 100) with stirring, to thereby form on that surface a light stabilizer-containing coating layer in the same manner as in Example 6. The thus-fabricated white film for a reflecting structure for surface light sources had good mean reflectance and good brightness, and was yellowed little in the durability test, and its mean reflectance reduction and brightness reduction were small, as in Table 1.

Comparative Example 2

A single-layer film-forming device equipped with an extruder A alone was used herein. PET chips containing 10% by weight of anatase-type titanium oxide particles having a mean particle size of 0.15 μm were fully dried in vacuum, fed into the extruder, and melt-extruded at 290° C. into a sheet. This was cast onto a chill drum at 20° C. to be a non-stretched sheet. The sheet was stretched in the machine direction and in the lateral direction, and then thermoset in to a white film having a thickness of 188 μm, in the same manner as in Example 1. The film was coated with a light stabilizer-containing coating layer, in the same manner as in Example 1.

As in Table 1, the coated film had few voids therein, and its initial reflectance and brightness were low.

TABLE 1

| Tested Matters | Thickness of Light stabilizer-containing Coating Layer | Content of Inorganic Fine Particles in coating layer | Mean Void Diameter Inner Layer | Mean Void Diameter Surface Layer | Specific Gravity | Glossiness | Initial Characteristics Mean Reflectance | Initial Characteristics Brightness | After Durability Test Mean Reflectance | After Durability Test Brightness |
|---|---|---|---|---|---|---|---|---|---|---|
| unit | μm | wt. % | μm | μm | — | % | % | cd/m² | % | cd/m² |
| Example 1 | 5 | 0 | 28 | 8 | 0.83 | 93 | 89 | 561 | 87 | 545 |
| Co. Ex. 1 | — | — | 28 | 8 | 0.83 | 25 | 91 | 573 | 64 | 334 |
| Example 2 | 1 | 0 | 28 | 8 | 0.83 | 90 | 90 | 567 | 78 | 497 |
| Example 3 | 3 | 0 | 28 | 8 | 0.83 | 92 | 90 | 564 | 83 | 525 |
| Example 4 | 7 | 0 | 28 | 8 | 0.83 | 95 | 88 | 554 | 87 | 543 |
| Example 5 | 10 | 0 | 28 | 8 | 0.83 | 95 | 86 | 538 | 85 | 531 |
| Example 6 | 5 | 0 | 28 | 8 | 0.83 | 93 | 86 | 563 | 84 | 548 |
| Example 7 | 5 | 3 | 28 | 8 | 0.83 | 57 | 87 | 566 | 85 | 550 |
| Example 8 | 5 | 5 | 28 | 8 | 0.83 | 41 | 88 | 571 | 85 | 552 |
| Example 9 | 5 | 7 | 28 | 8 | 0.83 | 30 | 89 | 574 | 86 | 554 |
| Co. Ex. 2 | 5 | 0 | no void | — | 1.43 | 71 | 76 | 458 | 74 | 436 |

INDUSTRIAL APPLICABILITY

Exposed to a light source, the white film for a reflecting structure for surface light sources of the invention is aged little with time. When built in liquid crystal displays, it ensures good image quality and brightness of the display screens for a long time. Therefore, the white film of the invention is favorable to reflecting sheets and reflectors in edge light-type and direct back light-type surface light sources for liquid crystal display screens.

The invention claimed is:

1. A white film for a reflecting structure for surface light source comprising:
   a film containing voids formed by melt extrusion of a mixture of a polyester resin and a resin not miscible with the polyester resin and/or organic or inorganic fine particles, and then stretching in at least one direction, and
   a light stabilizer-containing coating layer comprising a copolymer of 1) a resin component and 2) a light stabilizer component comprising a hindered amine and a benzotriazole, the copolymer having a molecular weight of at least 20,000, and having a thickness of 5 to 10 μm formed on at least one surface of the film,
   wherein the white film has 1) a mean reflectance of at least 85%, measured on the light stabilizer-containing coating layer thereof exposed to light having a wavelength of from 400 to 700 nm and 2) a degree of glossiness of at most 40% as measured on the light stabilizer-containing coating layer thereof.

2. The white film as claimed in claim 1, wherein the light stabilizer-containing coating layer further comprises organic and/or inorganic fine particles.

* * * * *